United States Patent [19]

Pollak

[11] 4,274,255
[45] Jun. 23, 1981

[54] CONTROL FOR START-UP OF A GAS TURBINE ENGINE

[75] Inventor: Robert R. Pollak, North Palm Beach, Fla.

[73] Assignee: United Technologies Corporation, Hartford, Conn.

[21] Appl. No.: 36,721

[22] Filed: May 7, 1979

[51] Int. Cl.³ ............................................. F02C 7/26
[52] U.S. Cl. ............................................. 60/39.14 R
[58] Field of Search ..................... 60/39.14 R, 39.28

[56] References Cited

U.S. PATENT DOCUMENTS

| 3,514,949 | 6/1970 | Fredlake et al. ............. 60/39.28 |
| 3,520,133 | 7/1970 | Loft et al. ............. 60/39.14 R |

Primary Examiner—Louis J. Casaregola
Attorney, Agent, or Firm—Norman Friedland

[57] ABSTRACT

A closed loop control for starting a gas turbine engine is disclosed. Upon engine ignition, fuel flow is adjusted as a function of the difference between a desired torque and actual torque so as to provide an optimum schedule to accelerate the engine to the idle speed condition.

11 Claims, 2 Drawing Figures

CONTROL FOR START-UP OF A GAS TURBINE ENGINE

BACKGROUND OF THE INVENTION

This invention relates to gas turbine engines and particularly to the logic of an electronic fuel control that monitors certain engine operating parameters indicative of torque and closes the loop of fuel flow to provide a given torque schedule for engine start-up.

As is well known in the jet engine control art, in engine start-up, that is, from the point that the engine is ignited to point where the engine reaches idle speed, the fuel control establishes a predetermined schedule. Heretofore, such fuel control schedules were open looped where a given power lever position initiated a built-in schedule that was designed to predict the engine's operating performances. Needless to say, such a built-in schedule was not absolutely accurate as it didn't account for variations in performance of different engines of a given engine model or control deterioration and the like.

Thus, in the typical fuel control, say, as examples, the model JFC-12, JFC-25 and JFC-60 manufactured by the Hamilton Standard Division of United Technologies Corporation, to which this patent application is assigned, or the AJ-H1, CJ-G5, CJ-G8 manufactured by the Bendix Energy Controls Division of the Bendix Corporation, the single fuel flow schedule is open looped and generally, merely biased by ambient air temperature. As is well known, the starting characteristics not only must account for the above mentioned parameters, it must also account for other functions of engine internal parameters, such as temperature and pressure. To do otherwise would be comprising engine start-up where such occurs over a wide range of starting requirements.

With the advent of electronic controls and its fast time responsiveness, the capability of monitoring certain engine operating parameters and optimizing engine start-up over a wide range of starting requirements has become a reality. It is important that the engine acceleration to idle be as fast as possible without incurring stall or surge. Thus, according to this invention, it is contemplated that engine start-up scheduling is achieved by monitoring given engine requirements and closing the loop on the monitored parameters as calculated to provide start-up scheduling by adjusting fuel flow and achieving stall-free and repeatable engine acceleration. It is contemplated within the scope of this invention that a torque error signal, indicative of the difference between a desired torque schedule obtained as a function of corrected rotor speed ($N/\sqrt{\theta}$), Mach No., and compressor inlet pressure (CIP) or compressor discharge pressure (CDP) and the actual torque, N acceleration times a constant, minus the torque utilized for aircraft accessories, and torque supplied by a starter, be used to provide the required fuel flow to provide acceleration.

Thus, according to this invention the condition of the engine prior to and during the start cycle is continuously monitored. The referenced and sensed parameters maintain the optimum scheduling of fuel throughout the start by providing the optimum acceleration characteristics without stalling the compression system.

SUMMARY OF THE INVENTION

An object of this invention is to provide for a gas turbine engine an optimum start-up control system that achieves fast start-up from ignition to idle without incurring stall. A further feature is to close the loop on the difference between a desired engine torque signal and an actual engine torque by adjusting fuel flow to the engine's main combustor system.

Other features and advantages will be apparent from the specification and claims and from the accompanying drawing which illustrates an embodiment of this invention.

DESCRIPTION OF THE PREFERRED EMBODIMENT

Figure 1:
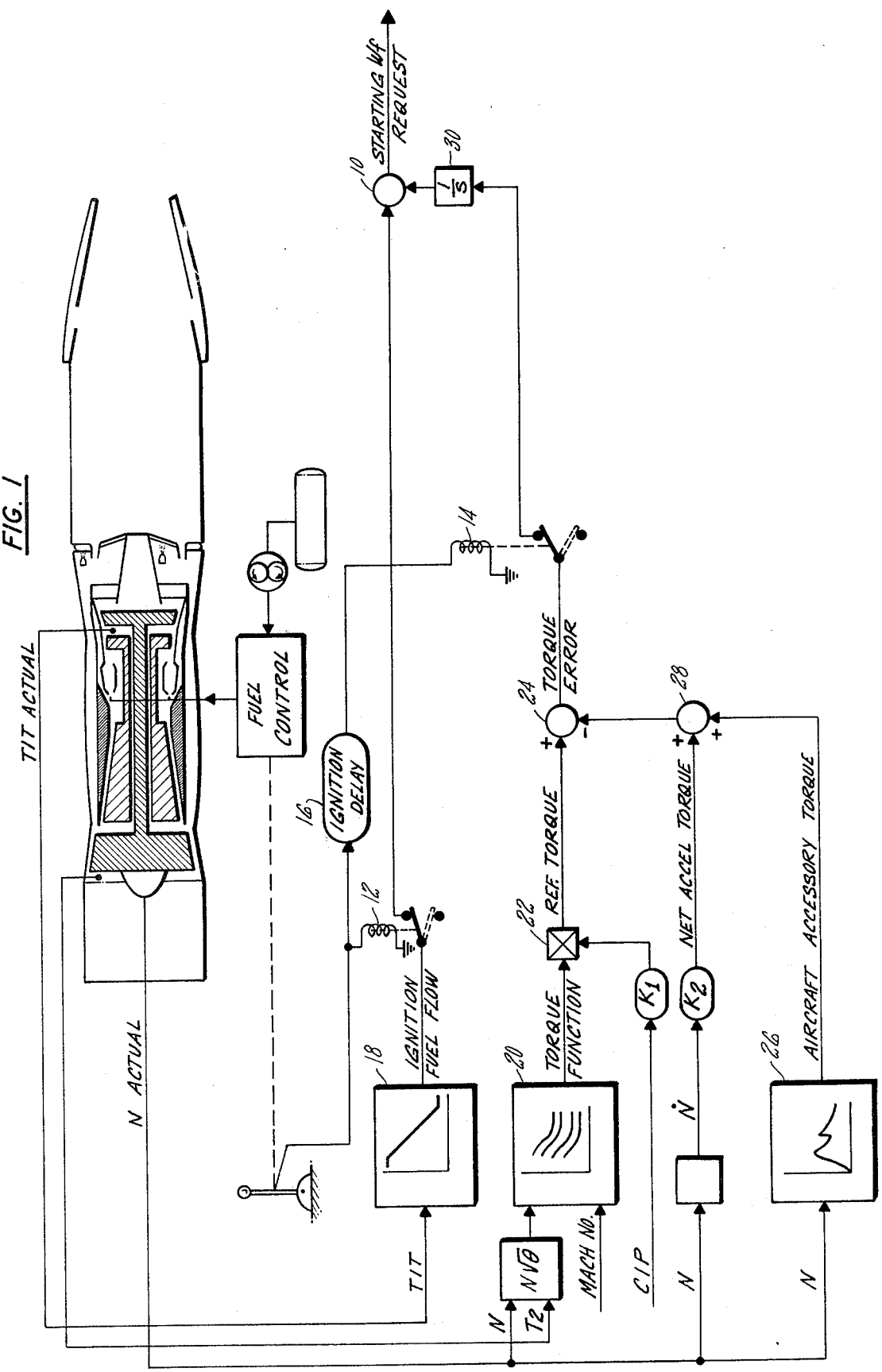
FIG. 1 is a block diagram illustrating the invention.

As can be seen in FIG. 1, the invention consists of two basic logic circuitries which consist of well known electronic components. The first logic is applied as the input to summer 10 which is a fuel flow signal established by the sums of the initial fuel flow signal which is a function of the temperature of the gaseous downstream of the engine's compressor and the second logic which is the other input to summer 10 to be described hereinbelow.

Initially, the power lever actuates the actuating relays 12 and 14 in timed sequence and the ignition delay 16. Ignition delay 16 serves to delay closed loop operation until the engine has obtained ignition. Simultaneously, the function generator 18 which schedules ignition fuel flow as a function of engine temperature, say turbine inlet or discharge temperature, is applied to the summer 10 which in turn passes through to the fuel control which begins filling the fuel manifold. After filling, the engine lights and begins to accelerate.

If the fuel flow were to remain constant during the start cycle, the acceleration rate would decrease as engine rotor speed increased which is due to the decreased fuel to air ratio at high engine airflows. It is contemplated by this invention that this condition is rectified by monitoring certain engine operating parameters and defining an optimum start-up schedule.

According to this invention, a desired torque signal is provided by function generator 20 which is generated as a function of corrected rotor speed ($N/\sqrt{\theta}$) and aircraft Mach. No. multiplied by compressor inlet or outlet pressure (engine inlet pressure may be equally used) which value is multiplied by a suitable constant $K_1$.

The output of the torque function signal multiplied by the product of the compressor inlet pressure signal multiplied by the $K_1$ constant in multiplier 22 is applied to the input to summer 24.

The next portion of the logic circuitry serves to provide a signal indicative of the actual torque. The control measures the acceleration of the compressor rotor (N) and multiplies it by a constant $K_2$ which is a moment of inertia constant. Since aircraft accessories, particularly at high altitudes, utilize a high percentage of the total engine torque, this invention takes this aspect into consideration by measuring the actual rotor speed and generating a signal indicative of aircraft accessories in the function generator 26. The output of this signal is applied to summer 28 which is added to the output of the multiplicand of the N and $K_2$ signal. The sum signal of summer 28 is applied to summer 24 which produces a signal indicative of the difference between the scheduled or desired torque signal and the actual torque signal.

The output from summer 24 is then applied to summer 10 through a suitable integrator 30 which serves to adjust the fuel flow to the engine request hydromechanical control unit.

As was noted above, the ignition relay 14 serves to pass the torque error signal solely after engine ignition. The igniter (combustion lightoff) time delay 16 is preset in the power lever circuit and accounts for fuel manifold fill time. After the delay time has elapsed, the torque error signal passes to the integrator 30 which adds to the basic ignition fuel flow.

Should the engine not light for any reason during the ignition time delay time period, the control will begin to raise fuel flow in an attempt to match reference torque. In so doing, the higher fuel flow scheduled to the engine will then provide a better condition for lightoff.

By virtue of this invention, the closed loop logic eliminates inaccuracies associated with the fuel delivery system, such as metering valve positions, pressures and the like. If a problem does exist with the delivery system, a correction is automatically made in the electronic control by way of the closed loop engine acceleration characteristics. Further, it compensates for cold or low grade fuel by automatically correcting for poor combustion.

Figure 2:
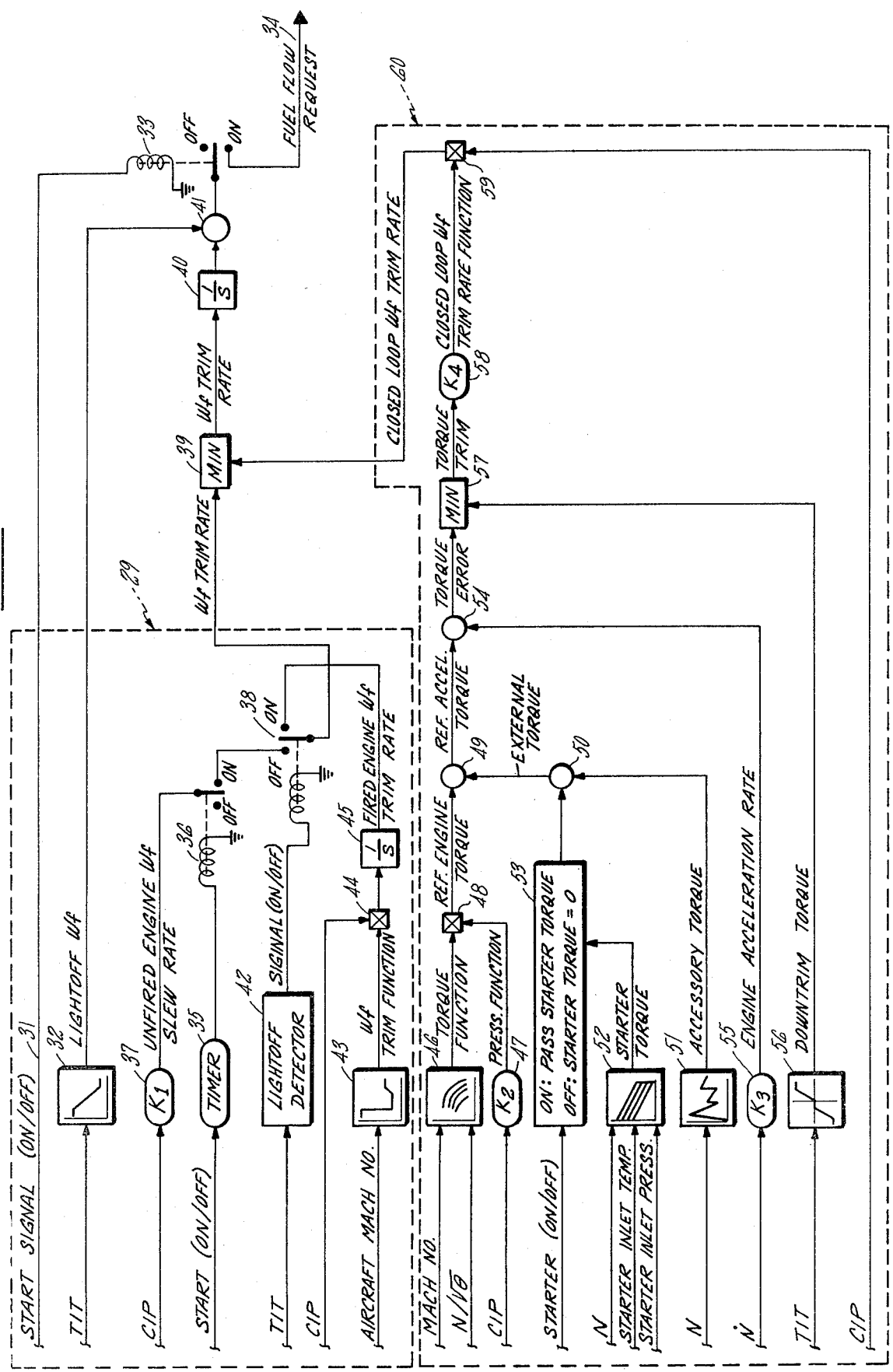
FIG. 2 is another block diagram illustrating another embodiment of the invention.

FIG. 2, another embodiment of this invention like the previous described embodiment, consists of two main logic circuitries which consist of well known electronic components.

The first is the acceleration initiation logic circuit contained within the dash line block bearing reference numeral 29 which operates in the following manner.

A start signal 31 is used to release the lightoff fuel flow scheduled by turbine gas temperature 32 (either turbine inlet or discharge) through the use of a relay 33 and provides the initial fuel flow request 34 to the engine.

The previously identified start signal also initiates a timer 35 which after a specified period of time triggers a relay 36 that passes the unfired engine fuel flow slew rate (a function of engine inlet, compressor inlet or discharge pressure multiplied by $K_1$ 37) through a relay 38, min select logic 39, and integrator 40 which is added to the lightoff flow at a summer 41 passing through the relay 33 to become an increasing fuel flow request 34.

A lightoff detector 42 measures gas temperature (either turbine inlet or discharge) to determine if ignition has taken place within the engine. The output signal from the detector activates a relay 38 which terminates the unfired engine fuel flow slew rate and passes the fired engine fuel flow trim rate. It is clear upon examination of the logic discussed so far, that the lightoff detector 42 can function before the completion of the timer 35 cycle.

The fired engine fuel flow trim rate, which is passed through relay 38, min selector 39, integrator 40, summer 41, relay 33 to become fuel flow request 34, is generated as follows: Aircraft Mach No. (or airspeed) is used to describe a fuel flow and trim function 43 which is acted upon by engine inlet or compressor inlet or discharge pressure by the multiplier 44 and integrator 45.

The fired engine fuel flow trim rate brings on the fuel flow to the engine in a slow enough manner after engine ignition to avoid stalling the compression system. As the rate of fuel flow delivery is continually increased into the min selector 39, the engine acceleration rate increases until the second main logic circuit, the closed loop acceleration logic is selected, by virtue of the closed loop fuel flow trim rate, at the min selector 39.

The closed loop acceleration logic circuit contained within the dash line block labeled reference numeral 60 functions as follows:

Aircraft Mach No. (or airspeed) and compressor (or engine) corrected rotor speed is used to define a torque function 46 which is acted upon by the pressure function 47 (generated by engine inlet or compressor inlet or discharge pressure acted upon by constant $K_2$) by the multiplier 48 to provide the reference engine torque which is applied to the summer 49. The other input of the summer 49 is external torque which is comprised of starter torque and accessory torque applied at the summer 50. The accessory torque represents the external load extracted from the engine and is a function of compressor (or engine) rotor speed 51. The starter torque 52 is generated by compressor (or engine) rotor speed, starter inlet temperature, and starter inlet pressure. The starter torque signal passes through a selector 53 which is triggered by the starter signal which establishes whether or not the starter is operating during the engine start. The output of summer 50 combined with summer 49 produces the reference acceleration torque which is applied to the summer 54 together with the engine acceleration rate as computed by compressor (or engine) rotor speed rate and constant $K_3$ 55. The output of summer 54 is the torque error and represents the difference between the prescheduled torques and the measured acceleration torque of the compressor rotor (or engine rotor). A downtrim torque, generated by turbine gas temperature (inlet or discharge) is used to nullify the impact of the torque error by using the minimum selector 57 in the event of a hot start, caused by compression system stall or overfueling occurs during the engine start thus automatically eliminating engine damage. The output of the minimum selector 57, torque trim, is acted upon by the constant $K_4$ 58, which yields the closed loop fuel flow trim rate function. This is acted upon by engine or compressor inlet pressure by the multiplier 59 to produce the closed fuel flow trim rate that is supplied to the minimum selector 39. As described previously, the output of the minimum selector 39 is acted upon by the integrator 40, the summer 41 (adding to lightoff fuel flow), the relay 33 to provide the fuel flow request signal 34 that is transmitted to the hydromechanical control effectors to modulate, as required, the fuel flow delivered to the engine.

By virtue of this invention, the closed loop logic eliminates inaccuracies of the fuel delivery system, such as metering valve position, pressures and the like. If a problem does exist with the delivery system, a correction is automatically made by the electronic control by way of the closed loop nature of the engine acceleration characteristics. Further, variations of fuel combustion characteristics due to type, quality, and/or temperature are similarly automatically compensated for by virtue of the closed loop characteristics.

It should be understood that the invention is not limited to the particular embodiment shown and described herein, but that various changes and modifications may be made without departing from the spirit or scope of this novel concept or defined by the following claims.

I claim:

1. A system for controlling fuel flow to a turbine type power plant for starting the engine from ignition to idle speed mode of operation including means responsive to certain engine operating parameters to schedule a reference torque signal, means responsive to the actual torque produced by said engine upon engine start-up for being compared to said referenced torque signal and means, including a fuel control for regulating fuel flow in accordance with the difference of said referenced torque signal and said actual torque signal for regulating the amount of fuel being fed to the engine during said mode of power plant operation.

2. A system as claimed in claim 1 wherein said power plant is utilized in addition to powering aircraft for driving aircraft accessories, means responsive to an engine operating parameter for converting said parameter into a torque signal and means responsive to the aircraft accessory torque and the actual torque for producing a signal that reflects the power plant propulsive torque which signal is utilized as the actual torque signal for controlling fuel flow during said mode of power plant operation.

3. A system as in claim 1 wherein said power plant includes a compressor, said scheduled torque signal being manifested as a function of compressor speed and compressor inlet pressure and said actual torque being manifested by compressor acceleration and a predetermined constant.

4. A system as in claim 1 wherein said fuel flow commences to said engine upon a predetermined actuated signal for initiating ignition and time delay means rendering said system inoperative until said ignition has been achieved.

5. A system as in claim 4 wherein said fuel fed to said power plant for ignition purposes is controlled as a function of the temperature at the inlet or outlet of said turbine.

6. A system as in claim 3 wherein a signal indicative of Mach No. biases said scheduled torque signal.

7. A system for controlling fuel flow to a turbine type power plant having a compressor and turbine for starting the power plant from ignition to idle speed mode of operation, a starter for imparting rotary motion to said compressor and turbine until a predetermined speed is achieved for ignition, an initial start-up portion responding to compressor inlet pressure and turbine inlet temperature for initiation ignition upon actuation of said starter, a closed loop start-up portion having means responsive to certain power plant operating parameters to schedule a referenced torque signal, means responsive to the actual torque produced by said power plant upon power plant start-up for being compared to said referenced torque signal and means including a fuel control for regulating fuel flow in accordance with the difference of said referenced torque signal and said actual torque signal for regulating the amount of fuel being fed to the power plant during said mode of power plant operation.

8. A system according to claim 7 wherein said certain power plant operating parameters includes compressor speed and compressor inlet or outlet pressure.

9. A system as claimed in claim 7 wherein said actual torque is measured by sensing compressor acceleration and multiplying it by a given constant.

10. A system as claimed in claim 7 including means responsive to turbine inlet or outlet temperatures for detecting a hot start of said power plant for biasing said actual torque signal to limit the heat generated in said power plant.

11. A system as claimed in claim 7 including means responsive to the torque generated by said starter and the torque from said power plant for aircraft accessories for biasing said referenced torque signal.

* * * * *